United States Patent
Brewer

(10) Patent No.: US 7,254,131 B2
(45) Date of Patent: *Aug. 7, 2007

(54) INTERCONNECTED ETHERNET AND 1394 NETWORK

(75) Inventor: Jason M. Brewer, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 366 days.

This patent is subject to a terminal disclaimer.

(21) Appl. No.: 10/694,277

(22) Filed: Oct. 27, 2003

(65) Prior Publication Data

US 2004/0088426 A1    May 6, 2004

Related U.S. Application Data

(63) Continuation of application No. 08/828,484, filed on Mar. 31, 1997, now Pat. No. 6,657,999.

(51) Int. Cl.
*H04L 12/50* (2006.01)
*G06F 15/16* (2006.01)

(52) U.S. Cl. ..................... 370/362; 709/250

(58) Field of Classification Search ........ 709/217–219; 713/153; 370/401
See application file for complete search history.

(56) References Cited

U.S. PATENT DOCUMENTS

| | | | | |
|---|---|---|---|---|
| 4,627,052 A | * | 12/1986 | Hoare et al. ............. | 370/402 |
| 4,831,620 A | | 5/1989 | Conway et al. | |
| 5,088,032 A | * | 2/1992 | Bosack ................... | 709/242 |
| 5,136,580 A | | 8/1992 | Videlock et al. | |
| 5,251,213 A | * | 10/1993 | Videlock et al. ......... | 370/403 |

(Continued)

FOREIGN PATENT DOCUMENTS

GB    2 283 645 A    10/1995

OTHER PUBLICATIONS

IEEE 1394: A Ubiquitous Bus, Hoffman, G., Moore, D., IEEE, 1063-6390, 1995, p. 334-338.*

(Continued)

*Primary Examiner*—Beatriz Prieto
(74) *Attorney, Agent, or Firm*—Ronald O. Neerings; Wade James Brady, III; Frederick J. Telecky, Jr.

(57) ABSTRACT

A network configuration (10) including a first network medium which is a 1394 network as well as a second network medium. Each of the first and second network media is coupled to a corresponding plurality of host computers (H1 through H3 and H5 through H7). The network configuration further includes a link layer gateway computer (H4) coupled to both the first network medium and the second network medium. The link layer gateway computer is operable to communicate a data packet from a source host computer selected from one of the plurality of host computers coupled to the first network medium to a destination host computer selected from one of the plurality of host computers coupled to the second network medium. Additionally, the link layer gateway computer is operable to communicate a data packet from a source host computer selected from one of the plurality of host computers coupled to the second network medium to a destination host computer selected from one of the plurality of host computers coupled to the first network medium

35 Claims, 3 Drawing Sheets

U.S. PATENT DOCUMENTS

| | | | |
|---|---|---|---|
| 5,309,437 A | | 5/1994 | Perlman et al. |
| 5,371,852 A | * | 12/1994 | Attanasio et al. ............ 709/245 |
| 5,452,292 A | | 9/1995 | Okanoue et al. |
| 5,479,407 A | * | 12/1995 | Ko et al. ..................... 370/231 |
| 5,590,285 A | * | 12/1996 | Krause et al. ............... 709/218 |
| 5,671,355 A | * | 9/1997 | Collins ........................ 709/250 |
| 5,742,905 A | * | 4/1998 | Pepe et al. ................... 455/461 |
| 5,781,550 A | * | 7/1998 | Templin et al. ............. 340/401 |
| 5,857,201 A | * | 1/1999 | Wright et al. ............. 707/104.1 |
| 5,883,621 A | | 3/1999 | Iwamura |
| 5,918,016 A | * | 6/1999 | Brewer et al. ............... 709/220 |
| 6,058,429 A | * | 5/2000 | Ames et al. ................. 709/242 |

OTHER PUBLICATIONS

IEEE 1394: Status and growth path, Diamond, S.L., Picosoft, IN., IEEE Micro, 0272-1732, 1966, p. 75-78.*

Low-cost Networks and Gateway for teaching Data Communications, Hughes, L., ACM 0-89791-298-5, 1989, p. 6-11.*

RFC 903: A Reverse Address Resolution Protocol, Finlyson et. al., Jun. 1984, p. 1-4.*

RFC 1009: Requirements for Internet Gateways, R. Braden & J. Postel, Jun. 1987, p. 1-55.*

"RFC 1027—Using ARP to Implement Transparent Subnet Gateways", J. S. Quarterman, et al., Network Working Group, Oct. 1987, XP002218271, Retrieved from the Internet: <URL:ftp://ftp.rfc-editor.org/in-notes/pdf_rfc/rfc1027.txt.pdf>, retrieved on Oct. 25, 2002.

"FDDI Lan Bridging Schemes", R. Shani, Electrical and Electronics Engineers in Israel, 1991, Proceedings., 17$^{th}$ Convention of Tel Aviv, Israel Mar. 5-7, 1991, New York, NY, USA, IEEE, US, May 3, 1991, XP010041250, ISBN: 0-87942-678-0.

"IEEE 1394: The Cable Connection to Complete the Digital Revolution", D. Moore, Skipstone, Inc., Oct. 11, 1996, XP002119363, Retrieved from the Internet: <URL:http://www.vxm.com/21R.49.html>.

Newton's Telecom Dictionary, Harry Newton, Telecom Books & Flariton Publishing, 1998.

* cited by examiner

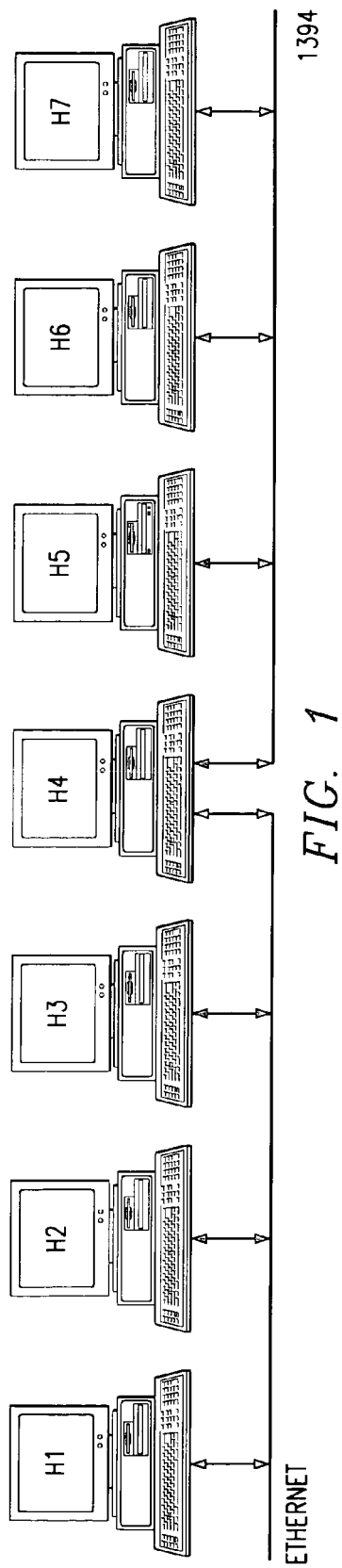
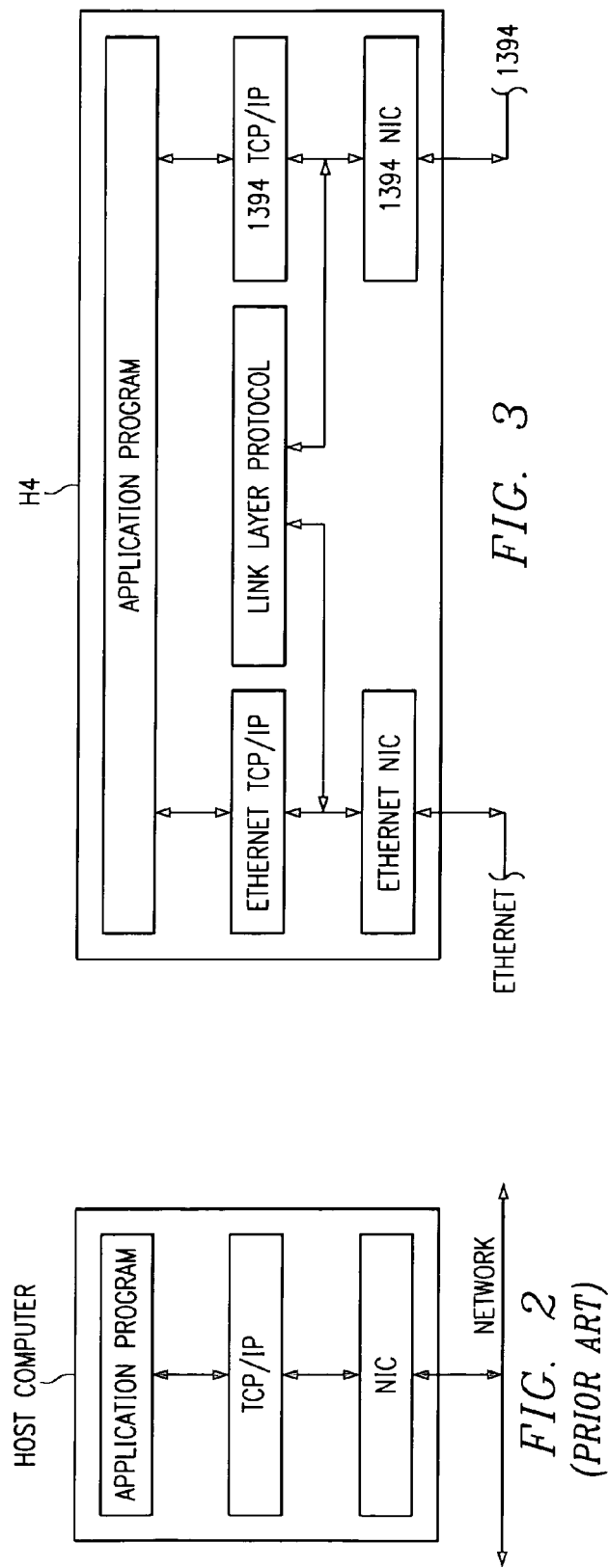

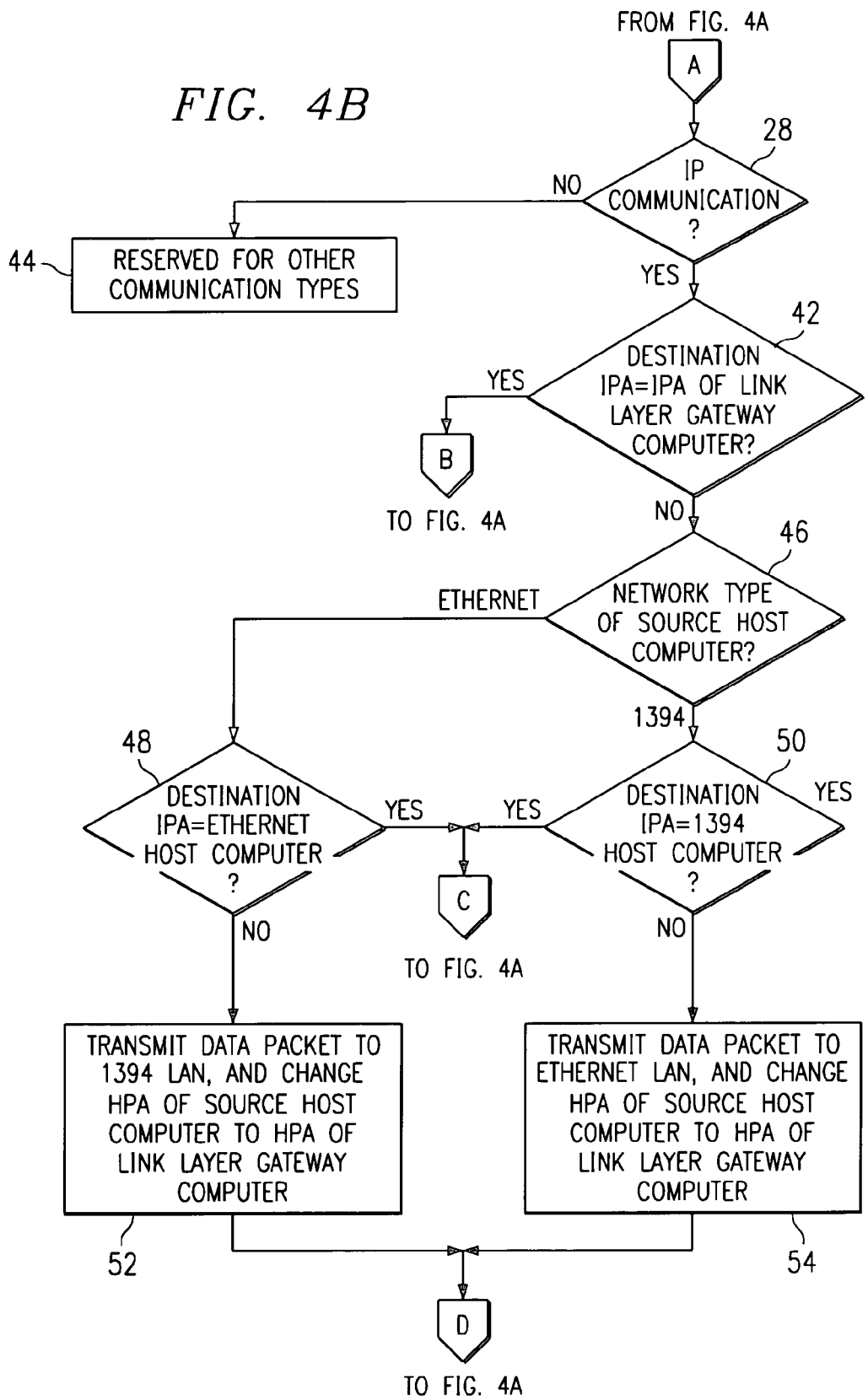

INTERCONNECTED ETHERNET AND 1394 NETWORK

CROSS-REFERENCES TO RELATED APPLICATIONS

This application is a Continuation of U.S. patent application Ser. No.08/828,484, Mar. 31, 1997 now U.S. Pat. No. 6,657,999.

STATEMENT REGARDING FEDERALLY SPONSORED RESEARCH OR DEVELOPMENT

Not Applicable.

BACKGROUND OF THE INVENTION

The present embodiments relate to computers and computer networks, and are more particularly directed to an interconnection of an Ethernet network to a 1394 network.

Data communication is now a key part of modern computing, and is available over a wide variety of networks. This data communication may be used for various reasons, such as business, science, personal, or purely entertainment. The various media to communicate data between users also has proliferated. Such media include both local area networks (LANs) as well as wide area networks (WANs). There is likely no clear formal line between the definition of a LAN or a WAN, but it is generally accepted that a LAN is for more local communication of data such as within a small location, building, or complex, while a WAN is for communication of data across a greater distance which may be across a nation or even worldwide. In any event, the existence of networks for purposes of data communication is now very popular, and appears to be a way of life for the foreseeable future.

Given the acceptance and proliferation of data communication among networks, over the past several years various types of networks have evolved to allow internetwork communication, that is, communication between host computers connected to two or more independent networks. Often these networks are heterogeneous architectures, meaning that at the network level one network has various attributes differing from the other network. Therefore, various governing groups and organizations have created standard techniques to allow communication between host computers on different network types, where that communication at the host level often appears to form a homogeneous network. These communication techniques are known as protocols, and are often implemented within each host rather than in the network medium. Moreover, such protocols are often located in an ordered manner such that the protocol handling occurs between the host's application level and the host's physical connection to its respective network. In any event, the protocol effectively hides the details of network hardware from the user and allows computers on different network types to communicate with one another independent of the network types.

One considerably prolific network protocol is known in the art as TCP/IP, where this name is actually a combination of the two standards used in the protocol. The first protocol is TCP which is an abbreviation for transport control protocol. The second protocol is IP which is an abbreviation for internetwork protocol. Although the name TCP/IP combines these two standards, in actuality the standards are implemented in an ordered level manner such that the TCP protocol is closer to the application level and the IP protocol is closer to the physical network connection level. Further, TCP/IP is well known and permits packets of information to be sent and received along different types of networks. For detailed information on TCP/IP, the reader may find numerous contemporary and commercially available publications, such as "Internetwork With TCP/IP," Volumes I through III, by Douglas E. Comer, Third Edition (1995 by Prentice Hall), which is hereby incorporated herein by reference.

By way of further background, one technique for permitting internetwork communication using P involves the use of so-called routers. A router is a computer which is physically connected to two different networks, and which may receive an information packet from a source host computer on one network and communicate it to a destination host computer on the other network. Note, however, that the use of a router also involves various complexities. This process is performed using subnetting as is known in the art. For example, to use the functionality of the router, each host computer on each network is particularly configured at the IP level to communicate with the IP level of the router when internetwork communication is desired. In other words, if a host computer intends to communicate an internetwork information packet to a destination host computer, then the host computer forms the information packet to include the IP information of the destination host computer and further encapsulates this information with the IP information of the router. Next, when the router receives the encapsulated packet, it recognizes from the multiple levels of IP information that the packet is ultimately intended for a destination host computer on another network. Thus, the router is required to take still additional action at the IP level. For example, the router strips the outer IP information from the packet, thereby leaving the IP information pertaining to the destination host computer. Note, however, that this stripping action changes the checksum or other appropriate verification information included with the information packet. Thus, the router is further required to re-calculate the checksum and include the new value with the packet prior to sending that packet on to the destination host computer. In addition to these complexities, note also that because the router functionality is at the IP level of communication, then it is typically required that it be included with an operating system for that computer to perform the above-discussed functionality. Some operating systems, however, do not include such functionality. Thus, either a more complex and often more expensive operating system is required to provide the router functionality, or the software provider is required to re-write the operating system to extend the IP to further include the router functionality. One skilled in the art will therefore appreciate these as well as various other complexities arising from internetwork communications performed by routers.

In view of the above, as more network types are created and grow in popularity, there arises a need to permit such networks to internetwork with already-existing networks. The present embodiments are directed at such a need, and arise specifically in the context of Ethernet and 1394 networks as detailed below.

BRIEF SUMMARY OF THE INVENTION

In one embodiment, there is provided a network configuration. The network configuration includes a first network medium which is a 1394 network as well as a second network medium. Each of the first and second network media is coupled to a corresponding plurality of host computers. The network configuration further includes a link layer gateway computer coupled to both the first network medium and the second network medium. The link layer gateway computer is operable to communicate a data packet from a source host computer selected from one of the plurality of host computers coupled to the first network medium to a destination host computer selected from one of the plurality of host computers coupled to the second network medium. Additionally, the link layer gateway computer is operable to communicate a data packet from a source host computer selected from one of the plurality of host computers coupled to the second network medium to a destination host computer selected from one of the plurality of host computers coupled to the first network medium. Other circuits, systems, and methods are also disclosed and claimed.

BRIEF DESCRIPTION OF THE SEVERAL VIEWS OF THE DRAWING

FIG. 1 illustrates a diagram of an internetwork configuration having a first network coupled to communicate to a second network, where internetwork communication is via a link layer gateway computer having network interface cards for each of the two networks;

FIG. 2 illustrates a prior art hierarchy of data communication in a host computer, where that hierarchy includes a network interface card coupled to a network, a TCP/IP protocol level coupled to the network interface card, and an application program coupled to the TCP/IP protocol level;

FIG. 3 illustrates a hierarchy of data communication in the link layer gateway computer of FIG. 1; and FIGS. 4A and 4B illustrate a method of operation of the link layer protocol of the link layer gateway computer of FIG. 3.

DETAILED DESCRIPTION OF THE INVENTION

Figure 4A:
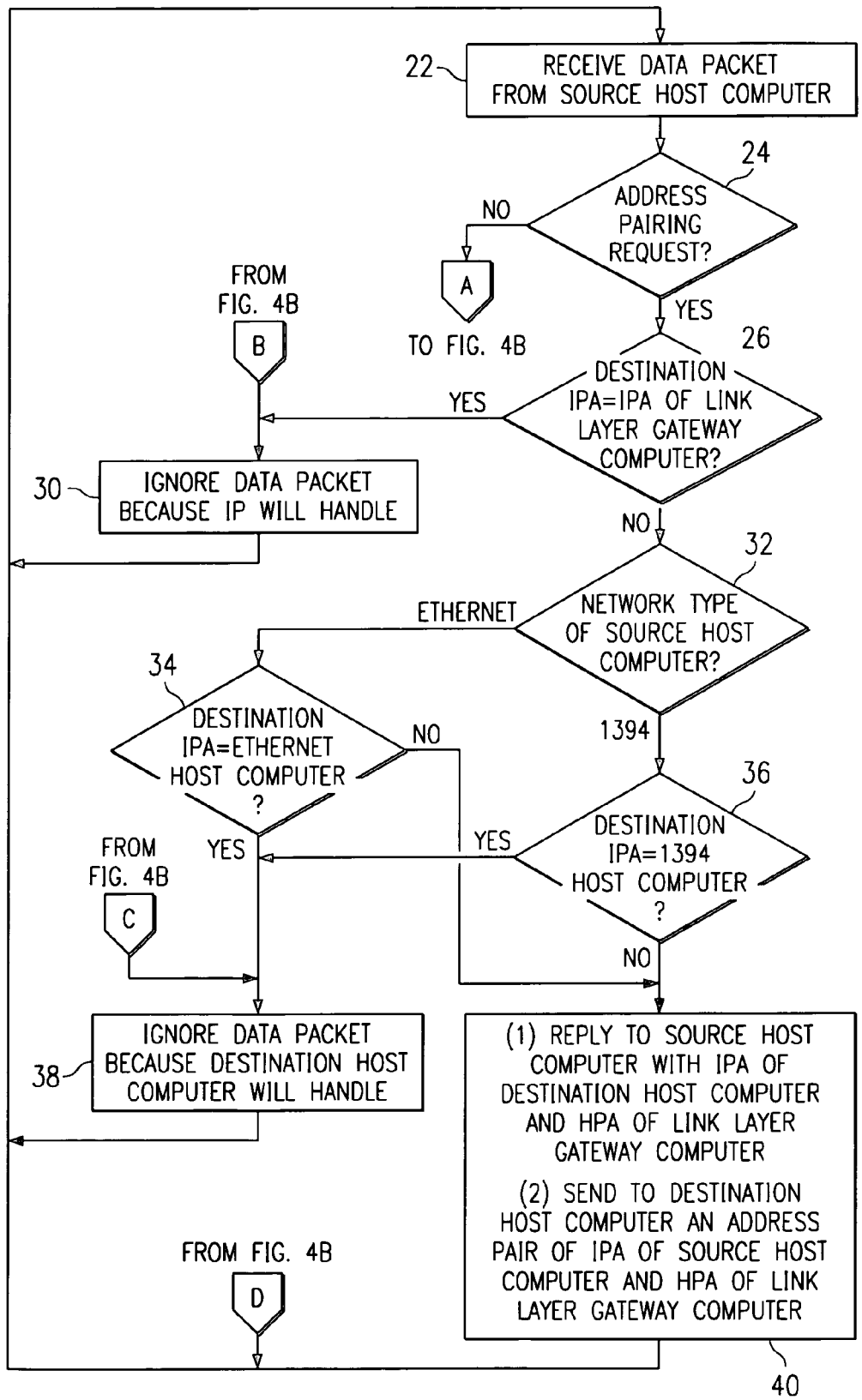

FIG. 1 illustrates a computer internetwork configuration designated generally at 10 and in accordance with the present inventive embodiments. Internetwork configuration 10 includes two separate computer networks. Particularly, in the preferred embodiment, internetwork configuration 10 includes an Ethernet network and an IEEE 1394 network (hereafter referred to as a "1394 network". Both of these network types are known in the art. Ethernet technology was developed in the early 1970s and has become quite popular in use for networks around the world. Moreover, Ethernet technology has given rise to numerous variants, such as differences in the medium used to communicate Ethernet signals (e.g., original coax, thin-wire Ethernet, twisted pair) as well as the electronic connection between the Ethernet medium and an interface within a host computer connected to the network. 1394 networks are based on an IEEE standard which was released during the 1990s, and which is directed to a high-speed serial bus which envisions communication of various types of devices connected to the bus such as computers as well as audio, visual, or audiovisual components (e.g., video cassette recorders, cameras, microphones, display units, and the like).

Each of the networks of FIG. 1 is connected to a number of host computers. For example, the Ethernet network is connected to four host computers designated as H1 through H4, and the 1394 network is connected to four host computers designated as H4 through H7. Importantly, and for reasons more clear below, note therefore that host computer H4 is connected to both of the two networks of configuration 10. Each of the remaining host computers is connected to only one of the two networks. Moreover, note that the number of host computers shown in FIG. 1 is merely by way of example, and therefore either a lesser or greater number of host computers could be connected to either the Ethernet network or the 1394 network. With respect to the 1394 network, devices other than computers, such as the audio and/or visual devices mentioned above, also may be connected to the network.

Internetwork configuration 10 may represent the entirety of a particular implementation, or alternatively may be part of various different configuration types and may span a wide range of distances. For example, the entire reach of internetwork configuration 10 may be a single room such as a conference room. Thus, given the teachings set forth below, a user may connect his or her host computer to either network in internetwork configuration 10 to participate in network communications in that conference room. Moreover, because of the two different network types, the user may have some level of choice as to which of the two networks to connect the user's host computer. For example, the user's host computer may include the necessary hardware (e.g., interface hardware) to communicate only with an Ethernet network. Accordingly, and as appreciated from the detailed description of later Figures, the user could connect its host computer to the Ethernet network of internetwork configuration 10 thereby also gaining the capability of communicating with the 1394 network and devices connected to that network. In any event, therefore, the flexibility of FIG. 1 may apply to smaller environments as well as slightly larger LANs. Still further, however, note also that the reach of either or both networks of internetwork configuration 10 may span far greater distances, such as within an entire building, between buildings or even beyond, and therefore the present embodiments may find use in the context of WANs as well.

FIG. 2 illustrates a block diagram demonstrating the hierarchy of data communication of any of the host computers H1 through H3 and H5 through H7 of internetwork configuration 10, and note that such a hierarchy is known in the art. Nevertheless, to present a background for discussing the inventive embodiment of FIG. 1 as well as additional aspects discussed after FIG. 2, a discussion is first presented below as to the three different levels of the data communication hierarchy as shown in FIG. 2.

At the bottom level of the data communication hierarchy shown in FIG. 2 is a network interface circuit which is typically formed as a computer card, and which is abbreviated as "NIC" in FIG. 2. The NIC represents the hardware interface, or so-called "link layer", between the motherboard bus of the host computer and the corresponding network medium. Note also that the NIC will have a hardware physical address. For example, in the Ethernet network, a unique 48-bit number known as an Ethernet address is assigned to each NIC. In other words, the manufacturer of the Ethernet NIC assigns this address to the physical hardware, and this hardware thereafter retains this unique number to distinguish it from any other Ethernet physical address. As another example, in the 1394 network, each NIC represents a physical layer which is assigned a hardware physical address upon reset of the 1394 network. The hardware physical address is sometimes referred to as a node ID in the 1394 terminology. Note also that the 1394 network reset occurs upon start-up of the network, and is also repeated at any time when a device is later added to the 1394 network; in other words, the 1394 network is "hot pluggable," meaning a device can be added to the network without having to bring down the network before such action. In the event of a hot plug-in of a device, hardware physical addresses are reassigned to each NIC connected to the 1394 network. Still further, note that an NIC is typically operable to filter certain information along the network from reaching the higher level of communication within a host computer. In other words, for some networks a data packet passing along the network has some type of code, such as a hardware physical address corresponding to an NIC of one of the devices connected to the network. Therefore, only the NIC with an address matching the physical address passes the data packet to the next upper level of the data communication in the host computer containing that NIC. Note further that this type of control in the NIC may be programmable. Still further, for certain types of data packets passing along a network, the packet may include a code which causes the NIC of more than one host computer to pass the corresponding packet to the next upper level of the data communication for each of those host computers. For example, a communication along a network is sometimes referred to as a "broadcast" communication when it is intended that all host computers along the network receive the communication. Typically, therefore, the broadcast communication includes the necessary type of code such that the NIC for each host computer on the network allows the packet of the broadcast communication to pass to the next upper level of the data communication for each of the host computers connected to the network. Still other examples of NIC response to physical addresses and comparable codes are known in the art.

At the middle level of the data communication hierarchy shown in FIG. 2 is a protocol handler which is commonly embodied in the operating system of the host computer. For example, the Windows 95 operating system currently provided by Microsoft includes the protocol handler shown in FIG. 2. Specifically, this protocol handler includes the internet protocol ("IP") and the transport control protocol ("TCP"), each of which also was discussed earlier in the Background of the Invention. Although not shown in FIG. 2, but as mentioned in the Background, note that the IP and TCP standards are typically implemented in an ordered level manner such that the TCP protocol is closer to the application level and the IP protocol is closer to the physical network connection level. Due to this ordering, note that a packet of information received from the network is first examined according to the IP standard, and then to the standard overlying the IP standard such as the TCP standard shown in FIG. 2. Thus, as an alternative, a standard other than the TCP standard may be used in FIG. 2 without departing from the necessary understanding and implementation of the inventive embodiments discussed in this document. For example, TCP is favorable in cases where it is desired to ensure that a data packet is received by a destination, or where a large block of data is to be broken down into separate packets for purposes of ensuring proper transmission and receipt of the block of data. However, as an alternative, the known user datagram protocol ("UDP") may be used where it is not necessary to confirm that the intended destination of the data packet actually receives the data packet, or where it is desired to send a data packet to one of more than one application programs running on a single destination host computer. Note also that UDP is sometimes referred to as an extension of TCP rather than an alternative to TCP. In any event, TCP, UDP, or perhaps still additional protocols represent an additional layer of data handling which may operate in conjunction with the IP standard.

Before proceeding with a discussion of the top level of the data communication hierarchy shown in FIG. 2, note that the above discussion introduces the notion that each host computer includes both an NIC responsive to a hardware physical address (hereafter abbreviated as an "HPA", and an IP. Indeed, and as detailed later, it is known in the art that a computer complying with the IP standard has an assigned IP address (hereafter abbreviated as an "IPA"). Thus, each host computer has an associated HPA and an IPA. To facilitate the remaining discussion, the following Table 1 below sets forth some arbitrarily assigned names for the IPA and HPA for each of the host computers of internetwork configuration 10.

TABLE 1

| host computer | IPA | HPA |
| --- | --- | --- |
| H1 | IPA1 | HPA1 |
| H2 | IPA2 | HPA2 |
| H3 | IPA3 | HPA3 |
| H4 | IPA4 | HPA4 |
| H5 | IPA5 | HPA5 |
| H6 | IPA6 | HPA6 |
| H7 | IPA7 | HPA7 |

Note in Table 1 that, for convenience sake, the reference numeral for a host computer is simply carried forward as part of its identifier for both its IPA and its HPA. Thus, the first host computer in Table 1 uses the reference numeral "1", and that value gives rise to an IPA of IPA1 and an HPA of HPA1. This convention as well as the remaining entries in Table 1 are used from this point forward to simplify the various examples described below.

Returning now to FIG. 2, at the top level of the data communication hierarchy shown is an application program which is typical of that used for internetwork operations. For example, various application programs are now quite popular for internetwork operations, such as electronic mail, file transfer, and remote login. Note that these application programs are only by way of example. Moreover, while FIG. 2 only illustrates a single application program, it is also possible that more than one application program may run on a computer in a multitasking environment, again such as that provided by the Microsoft Windows 95 operating system. Note that such applications have enjoyed that ability to communicate with one another in large part due to protocols such as TCP/IP in that these protocols often permit applications written by different companies to communicate with one another despite differences in programs as well as differences in the hardware of the communicating host computers.

Given the three levels of the hierarchy of data communication of any of the host computers H1 through H3 and H5 through H7 of internetwork configuration 10, note further that those levels are shown as bi-directionally coupled to one another. Thus, for an application program to communicate to its corresponding network, a packet (or packets) of data is formed and organized according to the TCP or other protocol at that level then further organized according to the IP of the host computer, and lastly altered if appropriate by the NIC to communicate the packet along the network medium. Conversely, if a packet is received by a host computer along a network medium, the packet is first analyzed at the NIC level, then the IP level, then the TCP (or other protocol) level if passed on by the NIC and IP levels, and ultimately may reach the application program.

Having presented the introductory discussion of the prior art hierarchy of a host computer as shown in FIG. 2, FIG. 3 illustrates a block diagram demonstrating the hierarchy of data communication of host computer H4 of internetwork configuration 10 in accordance with the present inventive embodiments. In certain respects, the hierarchy of FIG. 3 resembles that of FIG. 2, but is duplicated to accommodate the connection to two different types of networks. For example, at the bottom level of the hierarchy in FIG. 3, host computer H4 includes two NICs, one for the Ethernet network and labeled as the Ethernet NIC and one for the 1394 network and labeled as the 1394 NIC. At the middle level of the hierarchy, the Ethernet NIC and the 1394 NIC are each bi-directionally coupled to a respective protocol handler, where each of those respective protocol handlers are embodied in the operating system of the host computer. Again, each of these respective protocol handlers preferably include the IP standard. Moreover, each of these protocol handlers further includes at least one additional standard which is actually over the IP standard, and which by way of example in FIG. 3 is shown as the TCP standard. Additionally, again a standard other than the TCP standard (e.g., UDP or other standards) may be used in FIG. 3 without departing from the implementation of the present inventive embodiments. In any event, to accommodate the two different networks, it is therefore assumed that the operating system IP protocol handler is able to properly handle protocols for either Ethernet or 1394 data packets. At the top of the hierarchy in FIG. 3, each of the protocol handlers is bi-directionally coupled to one or more application programs. Again, as in the case of FIG. 2, these programs represent the type of program(s) which communicates data packets along a network configuration.

In addition to the blocks described immediately above, note further that host computer H4 further includes a link layer protocol shown at the same hierarchical level as is the Ethernet and 1394 IP protocols. This hierarchical ordering, as well as the term "link layer", are better appreciated from the operational description of the link layer protocol described below in connection with FIGS. 4A and 4B. At this point, however, note that in the preferred embodiment the link layer protocol is not part of the operating system of the host computer and, therefore, executes independent of the operating system protocol(s). This approach provides numerous advantages. For example, the functionality described below may be achieved without having to re-write or otherwise complicate the operating system of the host computer. As another example, the link layer protocol may be provided by a vendor independent of the vendor of the operating system. For example, in one embodiment, the functionality of the link layer protocol described below may be achieved in combination with the Windows 95 operating system in a manner which improves performance but does not require any change to that operating system. Still other examples will be ascertainable by one skilled in the art.

Having introduced the link layer protocol of host computer H4, but before detailing its operational steps as shown in FIGS. 4A and 4B, an introduction is instructive to the overall functionality of the link layer protocol as well as some of its aspects in connection with internetwork configuration 10 of FIG. 1. Recall from FIG. 1 that host computer H4 is connected to two different types of networks, with those being an Ethernet network and a 1394 network in the preferred embodiment. Although better appreciated below, note now that the link layer protocol of host computer H4 permits communication of data packets between those two networks. In other words, a host computer on one network may communicate a data packet, via the link layer protocol, to a host computer on the other network. For example, with the assistance of the link layer protocol of host computer H4, host computer H1 connected to the Ethernet network may communicate a data packet to host computer H6 of the 1394 network. From a simple diagram standpoint, consider this example given the coupling of the levels shown in FIG. 3. Once host computer H1 transmits its data packet, that packet is received from the Ethernet network by the Ethernet NIC of host computer H4. As detailed below, however, the link layer protocol of host computer H4 then detects that the data packet is intended for a host computer on the 1394 network, namely, host computer H6 in the current example. In response, the link layer protocol of host computer H4 directs the data packet to the 1394 NIC. Note also that because the link layer protocol is not coupled to the application program(s) of host computer H4, then this packet when directed in this manner does not reach such a program(s) on host computer H4. Once the 1394 NIC receives the data packet, it then transmits the data packet to the 1394 network. Thereafter, host computer H6 may receive the data packet and respond in whatever manner is appropriate given the data and protocol control included within that packet. Note that the above communication from the Ethernet network to the 1394 network is but one example, and others may be presented either in the same internetwork direction or from the 1394 network to the Ethernet network. As an example in this latter regard, with the assistance of the link layer protocol of host computer H4, host computer H5 connected to the 1394 network may communicate a data packet to host computer H2 of the Ethernet network. Again considering this example from a simple diagram standpoint, once host computer H5 transmits its data packet, that packet is received from the 1394 network by the 1394 NIC of host computer H4. Next, the link layer protocol of host computer H4 detects that the data packet is intended for a host computer on the Ethernet network, namely, host computer H2 in the current example. In response, the link layer protocol of host computer H4 directs the data packet to the Ethernet NIC of host computer H4. Again, note therefore that the data packet does not reach any application program(s) of host computer H4. Once the Ethernet NIC of host computer H4 receives the data packet, it transmits the data packet to the Ethernet network. Thereafter, host computer H2 may receive the data packet and responds in whatever manner is appropriate given the data and protocol control included within that packet.

FIGS. 4A and 4B illustrate a flow chart of a preferred method designated generally at 20 and which identifies various steps of operation of the link layer protocol of host computer H4. Before discussing those steps, recall that Table 1 above introduced the concept of the IPA as corresponding to each of the host computers in internetwork configuration 10. Given that introduction, note further in the preferred embodiment that the link layer protocol preferably is aware of each of the IPAs of the host computers connected to the 1394 network prior to performing the steps of method 20 shown in FIGS. 4A and 4B. Thus, these IPAs are preferably stored in an IPA table which is accessible to the link layer protocol for reasons more clear below. Note also that the IPA table may be completed using various techniques. For example, as one approach, the IPA of each 1394-connected host computer may be manually entered through some software interface into the IPA table of host computer H4. As another example, given the reset procedure of a 1394 network, one skilled in the art may develop some type of querying capability whereby each 1394-connected host computer reports its IPA to the host computer having the link layer protocol. In any event, given availability to the entries in its IPA table, the link layer protocol is able to perform in various manners as described below.

Turning to method 20 of FIGS. 4A and 4B, it begins with a step 22 where the link layer protocol receives a data packet from one of either the Ethernet or 1394 networks. Note further that method 20 does not indicate or otherwise affect the operation of the prior art protocols of host computer H4, that is, either the Ethernet TCP/IP or the 1394 TCP/IP. Therefore, while the link layer protocol receives the data packet from one of either the Ethernet or 1394 networks as shown in step 22, either one of the Ethernet TCP/IP or the 1394 TCP/IP will receive it as well, and may respond as is known in the art which is also reviewed in some instances below. In any event, returning to the link layer protocol, after the data packet is received in step 22, method 20 continues to step 24.

Step 24 determines whether the received data packet is an address pairing request such as the address resolution protocol ("ARP") request as is known under the IP standard. If so, method 20 continues to step 26. On the other hand, if the issued packet is not an address pairing request, method 20 continues to step 28.

Before detailing step 26, some introductory comments are instructive about ARP requests as an example of address pairing requests in general. Under the IP standard as used in Ethernet and some other network types, an ARP request is issued by a source host computer to determine the HPA of a destination host computer attached to the same network where the request is based on the IPA of the destination host computer. Thus, if a source host computer desires to ascertain the HPA of a destination host computer on the same network, then the source host computer broadcasts an ARP request to its network and in that request includes a destination IPA of the desired destination host computer. Recall from earlier that the term "broadcast request" means that the request, which in this case is the ARP request, is passed by each NIC on to its respective IP protocol handler. However, under known art, only the host computer having an IPA matching the destination IPA in the ARP request responds. For example, assume that host computer H1 issues an ARP to host computer H3. Although each of host computers H2, H3, and H4 receives the broadcast response and their corresponding Ethernet NICs couple the request to their corresponding protocol handlers, only the IP protocol handler of host computer H3 responds because it determines that its IPA matches that of the ARP request. In its response, the IP protocol handler of host computer H3 returns the same destination IPA of the request, but also returns its own HPA of HPA3. In other words, host computer H3 provides an address pair in response to the ARP request, where that pair includes both the destination IPA as well as the HPA of host computer H3. Because host computer H1 issued the ARP request, it then receives the address pair and enters it into an address pairing table so that it is thereafter known (until the table entry is reset) that the issued destination IPA equal to IPA3 corresponds to HPA3 of host computer H3.

The above introduction to address pairing requests (e.g., ARP) is in the context of a single network; however, recall that the link layer of host computer H4 involves two interconnected networks. Thus, step 26 as well as the steps following it further take into account the possibility of an address pairing request issued from a source host computer on one of either the Ethernet network of the 1394 network of internetwork configuration 10, where the destination host computer is located on the opposite network. For example, a host computer on the Ethernet network may issue an ARP request with the IPA of a host computer on the 1394 network. As another example, a host computer on the 1394 network may issue an address pairing request with the IPA of a host computer on the Ethernet network. In this latter capacity, note that 1394 terminology is not necessarily using the term ARP to describe this request, but under the currently developing 1394 standard it is clear that some type of analogous address pairing request will be available whereby a 1394 host computer may issue such an address pairing request to another device connected to the same 1394 network.

Turning then to step 26, it determines whether the IPA of the destination host computer, as identified in the address pairing request, matches the IPA of host computer H4. If a match is found method 20 continues to step 30, whereas if a match is not found method 20 continues to step 32. Each of these alternative paths is discussed below.

Step 30, having been reached because the destination IPA matched the IPA of host computer H4, merely ignores the address pairing request. In other words, recall that method 20 is the operation of the link layer protocol as shown in FIG. 3, and that the link layer protocol operates at the same level as the two TCP/IP protocol blocks also shown in that Figure. Given that configuration, note that when step 30 is reached, the address pairing request received along the Ethernet network, having identified the IPA of host computer H4, will be serviced by the Ethernet TCP/IP protocol of FIG. 3. Thus, there is no need for the independent link layer protocol to respond to the request and, indeed, it is preferable therefore that the link layer protocol does not interfere with the action of the Ethernet TCP/IP. Consequently, in the preferred embodiment of the operation of the link layer protocol, the response of step 30 is to permit the Ethernet TCP/IP protocol of FIG. 3 to respond to the address pairing request. Thereafter, method 20 returns to step 22 so that the link layer protocol may receive an additional data packet and respond in the appropriate manner.

Step 32 is reached when the destination IPA from the address pairing request does not match the IPA of host computer H4. In response, step 32 identifies which network is connected to the source host computer which transmitted the address pairing request. Specifically, recall from above that host computer H4 has separate NICs connected to each of the different networks (i.e., one to the Ethernet network and one to the 1394 network). Therefore, step 32 may be performed by determining which of the NICs received the address pairing request, thereby indicating that the source host computer is on the same network that is connected to that corresponding NIC. In other words, if the 1394 NIC received the address pairing request, it is known that the source host computer is connected to the 1394 network. On the other hand, if the Ethernet NIC received the address pairing request, it is known that the source host computer is connected to the Ethernet network. Thereafter, the response to this determination is as follows. If the source host computer is on the Ethernet network, method 20 continues from step 32 to step 34. On the other hand, if the source host computer is on the 1394 network, method 20 continues from step 32 to step 36. Each of these alternative paths is discussed below.

Step 34, having been reached because an Ethernet host computer issued the address pairing request, determines whether the destination host computer is also on the same Ethernet network. Again, step 34 also may be accomplished by the link layer protocol of host computer H4 using its IPA table in the same manner as described above in connection with step 32. Once the determination is made, if the destination host computer is also on the Ethernet network, method 20 continues from step 34 to step 38. On the other hand, if the destination host computer is not on the Ethernet network, method 20 continues from step 34 to step 40.

Note that step 38 is reached when both the source host computer of the address pairing request as well as the destination host computer are both on the same network (i.e., an intranetwork communication), and when step 38 is reached from step 34 this same network is the Ethernet network. In response, step 38 ignores the address pairing request. More specifically, note that although the link layer protocol of host computer H4 has now received the address pairing request, the actual destination host computer on the Ethernet network also should have received that request and should be responding to the request. Therefore, by having the link layer protocol ignore the request, the response to that request may be responded to by the intended destination host computer in the same manner as in the prior art. Note therefore that this aspect of the present embodiment permits the internetwork function described below but does not add interference and/or burden to each separate network when an intranetwork communication is intended. In any event, after step 38, method 20 returns to step 22 so that it may receive another data packet and respond in the appropriate manner.

Note that step 40 is reached when the link layer protocol has received an address pairing request where the source of the address pairing request is connected to the Ethernet network but the destination host computer for that request is connected to the 1394 network (i.e., an internetwork communication). In this case, the link layer protocol of host computer H4 operates to communicate the request between the two different network host computers as follows. As one responsive action, in step 40 the link layer protocol replies to the request with an address pairing, again where that pairing includes the destination IPA of the request as well as an HPA to be paired with the destination IPA. However, note that the HPA returned to the request is the HPA of host computer H4 rather than the HPA of the destination host computer on the 1394 network. An example at this point further illustrates this action. Suppose that host computer H1 of the Ethernet network issues an ARP request to host computer H6 of the 1394 network. In other words, H1 issues an ARP with a destination IPA of IPA6. Therefore, one skilled in the art will confirm that step 34 is reached using method 20. In response, the link layer protocol performs the first action of step 40 by replying to host computer H1, and that reply includes the source IPA (i.e., IPA1), the destination IPA (i.e., IPA6), but the HPA of host computer H4 (i.e., HPA4) rather than the HPA of host computer H6. Therefore, upon receiving this reply, the source host computer H1 will enter the received address pair into its address pairing table so that its subsequent communications according to this table will pair the values of IPA6 with HPA4. Therefore, note now that the address pairing has an HPA which relates to one host computer and an IPA which relates to a different host computer. Therefore, the link layer (i.e., the HPA) becomes an issue when later detecting, from an address pairing, that a packet is intended to be an internetwork communication. It is this concept, as better understood after additional detail below, that the protocol in FIG. 3 is referred to as a link layer protocol. In any event, looking now to the second action of the link layer protocol, it also forwards information to the internetwork destination host computer. Specifically, the link layer protocol forwards to the destination host computer an address pairing for entry into the address pairing table of destination host computer. Particularly, this address pair includes the IPA of the source host computer which issued the ARP, and paired with that source IPA is the HPA of host computer H4 rather than the HPA of host computer H1. Thus, in the immediately preceding example, this pair includes IPA1 and HPA4, and upon receiving this information host computer H6 will enter the pair into its address pairing table. Again, therefore, an IP address for one host computer is paired with the HPA (i.e., the link layer address) for a different host computer. The purpose and benefits of each of the two address pairings communicated by the link layer protocol will be better understood from the discussion of step 28 and the steps following it as described later.

Returning now to step 32, recall it is followed by step 36 when a source host computer connected to the 1394 network issues an address pairing request to a destination host computer other than host computer H4. Step 36 then performs an analysis similar to that of step 34, but is based on the 1394 network rather than the Ethernet network. Therefore, step 36 determines whether the destination host computer is also on the same 1394 network, and this step is performed by the link layer protocol of host computer H4 preferably using its IPA table in the same manner as described above in connection with step 32. Once the determination is made, if the destination host computer is also on the 1394 network, method 20 continues to step 38 which, as described above, ignores the request because a different host computer should respond to the request (i.e., in this case, another host computer on the 1394 network). On the other hand, if the destination host computer is not on the 1394 network, method 20 continues from step 36 to step 40. Therefore, one skilled in the art will appreciate that once again, for an internetwork address pair request, which here is for a source host computer on the 1394 network and for a destination host computer on the Ethernet network, the link layer protocol performs the two operations described above in connection with step 40. Thereafter, method 20 returns to step 22 so that the link layer protocol may receive another data packet and respond in the appropriate manner.

Having discussed the various alternative method steps in response to a data packet having an address pairing request as detected by step 24, later there is a discussion of method 20 in response to a different type of data packet. Before reaching that discussion, a brief conclusion is helpful in reviewing the steps discussed thus far. In general, step 24 directs the method flow to step 26 when the link layer protocol detects an address pairing request on either of the networks of internetwork configuration 10. Steps 34 and 36 determine whether the address pairing request is either an intranetwork or an internetwork request. If the request is an intranetwork request, then the link layer protocol ignores the request under the assumption that the request will be handled by an independent TCP/IP protocol handler (either of host computer H4 or a different host computer). If the request is an internetwork request, then the link layer protocol replies to the source host computer with an address pair, where that pair includes the destination IPA from the request and the HPA of host computer H4 rather than the HPA of the actual destination host computer. Moreover, the link layer protocol forwards to the destination host computer an address pair, where that pair includes the source IPA from the request and the HPA of host computer H4 rather than the HPA of the source host computer.

Turning now to step 28, it determines whether the data packet includes an IP communication packet as is also known under the IP standard. Generally, an IP communication includes the IPA of the source host computer, the IPA of the destination host computer, a block of data, and other formatting information according to the IP standard included within the TCP/IP standard or other applicable IP standard.

Note further that if the data packet includes an IP communication, then according to known media access control ("MAC") standards there will also be the HPA of the destination host computer accompanying the IP communication. Thus, note that the IP communication along with its MAC layer will together include an address pairing which may be obtained by an earlier-issued ARP or comparable address pairing request. In any event, in response to step 28, if the data packet is an IP communication, method 20 continues to step 42. On the other hand, if the issued packet is not an IP communication, method 20 continues to step 44. Each of these alternative paths is discussed below.

Step 42 operates generally in the same manner as step 26 described above, but here with respect to the received IP communication. Thus, step 42 determines whether the IPA of the destination host computer, as identified in the IP communication, matches the IPA of the computer having the link layer protocol (i.e., host computer H4). If a match is found method 20 continues from step 42 to step 30, whereas if a match is not found method 20 continues from step 42 to step 46. Each of these alternative paths is discussed below. Before discussing those alternatives, however, note further that the operation of the NIC also may be implied in step 42 (or step 28) and may indeed render some of the following steps optional. Specifically, note that step 42 is based on an evaluation of information at the level of the link layerθ protocol and, from FIG. 3, recall that this is one level higher than the operation of the NIC. Therefore, for the link layer protocol to receive information in order to perform the analysis of step 42 or other steps below, it is necessary that the underlying NIC has allowed that information to pass to the link layer protocol. More specifically, recall that an IP communication will be accompanied by a MAC layer which includes the HPA of the destination host computer. Therefore, if the HPA set forth in the IP communication does not match that of the host computer containing the link layer protocol (i.e., host computer H4 in the example of FIG. 3), then the IP communication may be prevented by the NIC of that host computer from reaching the link layer protocol and step 42 will not occur. Conversely, assuming the required information is passed by the NIC so that it may reach the link layer protocol, then the link layer protocol operates to perform step 42 in the fashion described above.

Once method 20 passes flow from step 42 to step 30, then the operation may be appreciated by referring the reader to the above discussion of that step for greater detail. Briefly, however, recall that in step 30 the link layer protocol ignores the current data packet, which in the present case is an IP communication. Instead, given the configuration in FIG. 3 and when step 30 is reached following step 42, then the data packet having identified the IPA of host computer H4 is serviced by either the Ethernet TCP/IP protocol or the 1394 TCP/IP protocol of FIG. 3. Thus, there is no need for the independent link layer protocol to respond to the IP communication and, indeed, it is preferable that the link layer protocol does not interfere with the action of the proper TCP/IP protocol. Thereafter, method 20 returns to step 22 so that the link layer protocol may receive another data packet and respond in the appropriate manner.

Step 46 is reached when an IP communication includes a destination IPA which does not match the IPA of the host computer including the link layer protocol (i.e., host computer H4). In response, step 46 operates in the same general manner as step 32 described above and, therefore, the reader is once again referred to the above discussion. Briefly, however, note that step 46 identifies which network is connected to the source host computer that transmitted the IP communication. Specifically, based on which of the two NICs received the IP communication, the link layer protocol of host computer H4 determines to which of the two networks the source host computer is connected. Thereafter, the response to this determination is as follows. If the source host computer is on the Ethernet network, method 20 continues from step 46 to step 48. If the source host computer is on the 1394 network, method 20 continues from step 46 to step 50. Each of these alternative paths is discussed below.

Step 48 operates generally in the same manner as step 34 described above, but here with respect to the received IP communication. Thus, step 48, having been reached because an Ethernet host computer issued the IP communication, determines whether the destination host computer is also on the Ethernet network. Again, this operation is accomplished by the link layer protocol of host computer H4 preferably using its IPA table in the same manner as described above in connection with step 42. Once the determination is made, if the destination host computer is also on the Ethernet network, method 20 continues from step 48 to step 38 described above. On the other hand, if the destination host computer is not on the Ethernet network, method 20 continues from step 48 to step 52.

From the preceding paragraph, note that step 38 is reached from step 48 when both the source of the IP communication as well as the destination host computer are both on the same network (i.e., an intranetwork communication), and when step 38 is reached from step 48 this same network is the Ethernet network. As discussed above, the link layer protocol ignores the IP communication in step 38 because, although the link layer protocol of host computer H4 may now have received the IP communication, the actual destination host computer on the Ethernet network also should have received that IP communication and should respond appropriately. Thereafter, method 20 returns to step 22 so that the link layer protocol may receive another data packet and respond in the appropriate manner.

In addition to the effect of step 38 as discussed immediately above, note that it also involves a step which may be implied or need not actually be performed due to the operation of the NIC in connection with the HPA in the IP communication. More specifically, note that step 38 is reached from step 48 when the IP communication included a destination IPA which did not match the IPA of the host computer with the link layer protocol (i.e., host computer H4), and further when the communication was an intranetwork communication between Ethernet connected host computers. Therefore, one skilled in the art will appreciate that the destination HPA accompanying the IP communication will correspond to a host computer other than host computer H4. Therefore, if the Ethernet NIC of each Ethernet-connected host computer operates in the manner described above, then it is quite possible that the link layer protocol of host computer H4 will not receive the IP communication. In other words, because the destination HPA accompanying the IP communication corresponds to a host computer other than host computer H4, then only the IP protocol of that other host computer should receive the IP communication and, thus, there is no need for the link layer protocol to respond. However, if for some reason the NIC of host computer H4 received the IP communication, then the flow from step 48 to step 38 provides a preferred method flow so that host computer H4 does not respond to the IP communication.

Turning now to step 52, note that it is reached when the link layer protocol has received an IP communication where the source of the IP communication is connected to the Ethernet network but the destination host computer for that communication is connected to the 1394 network (i.e., an internetwork communication). In this case, the link layer protocol of host computer H4 operates to communicate the IP communication from the Ethernet network to the 1394 network. In addition, note that the link layer protocol changes the destination HPA of the IP communication so that the communication is received by the proper destination host computer. More specifically, note that step 52 is reached when the IPA in the IP communication represents an internetwork communication, but further when the HPA accompanying the IP communication designates the HPA of the computer including the link layer protocol (i.e., host computer H4 ). For example, assume that host computer H1 is sending an IP communication to host computer H7. Therefore, at some earlier stage, host computer H1 should have issued an address pairing request to IPA7 corresponding to host computer H7. In response to that request, and based on steps 24, 26, 32, 34, and 40, host computer H1 should have created an entry in its IPA table pairing IPA7 with HPA4 (i.e., the HPA indicating the computer having the link layer protocol). Thus, if host computer H4 were to merely forward the IP communication and its accompanying HPA to the 1394 network, then the destination host computer H7 would not respond because its NIC responds to an HPA of HPA7, and not the HPA value of HPA4 accompanying the IP communication. Therefore, in the preferred embodiment, the link layer protocol replaces the HPA in the IP communication with the HPA which corresponds to the destination host computer. Note at this point, therefore, that the link layer protocol creates a match between the IPA and the HPA of the destination host computer. Therefore, once the IP communication and the newly accompanying HPA are communicated to the 1394 network, the link layer (i.e., the NIC) of the destination host computer will properly respond to the communication. Again, therefore, one skilled in the art will thus appreciate the use of the term link layer in connection with the protocol of the present embodiment. Indeed, in this regard, it is further helpful to described the computer (e.g., host computer H4 ) which includes the link layer protocol as a link layer gateway, that is, a computer which thereby accomplishes the internetwork communication of an appropriate data packet using the link layer-related techniques of the present embodiments. Returning then to the current example, the link layer protocol replaces the value of HPA4 with a value of HPA7 corresponding to host computer H7. Note that the newly used value for the HPA should be available to the link layer protocol so long as host computer H4 earlier performed its own address pairing request to the destination host computer. In other words, if host computer H4 has earlier sent an address pairing request to host computer H7, then host computer H4 should have an entry in its address pairing table correlating IPA7 with HPA7. Given this information, and returning to the replacement operation by the link layer protocol in step 52, recall that after changing the HPA value as described above, the link layer protocol transmits the IP communication and the new HPA to the 1394 NIC so that it may then pass to the 1394 network. Thereafter, method 20 returns to step 22 so that the link layer protocol may receive and respond to another data packet.

Given the above discussion of step 52, note further that the IP communication processed and forwarded by the link layer protocol may indeed lead to a different IP communication in the opposite direction, that is, from the 1394 network to the Ethernet network. For example, recall the preceding example discussed the transmission of an IP communication from host computer H1 to host computer H7. Upon receiving the communication, it may be desirable for host computer H7 to send an IP communication to host computer H1. As detailed later in connection with steps 50 and 54, the link layer protocol of the present embodiments further permits this action as well.

Returning to step 46, recall that it directs the method to step 50 when the source host computer is on the 1394 network. Thus, the example of an IP communication from H7 to H1 as set forth in the immediately preceding paragraph would cause method 20 to pass from step 46 to step 50. Step 50 operates in the same manner as step 48, but here the inquiry is with respect to the 1394 network rather than the Ethernet network. Consequently, step 50 determines whether the destination host computer is on the same network as the source, that is, whether the destination host computer is on the 1394 network. Again, this operation is accomplished by the link layer protocol of host computer H4 preferably using its IPA table. If the destination host computer is also on the 1394 network, method 20 continues from step 50 to step 38 described above. If the destination host computer is not on the 1394 network, method 20 continues from step 50 to step 54.

From the preceding paragraph, note that step 38 is reached from step 50 when the source of the IP communication as well as its destination form an intranetwork communication along the 1394 network. As discussed above in connection with step 38, the link layer protocol then ignores the IP communication because the actual destination host computer on the 1394 network also should receive the IP communication and respond appropriately. Thereafter, method 20 returns to step 22 so that the link layer protocol may receive an additional data packet and respond in the appropriate manner. In addition, note here again that step 38 also may be implied or need not actually be performed due to the operation of the NIC in connection with the HPA which accompanies the 1394 intranetwork IP communication. More specifically, step 38 is reached from step 50 when the IP communication includes a destination IPA which does not match the IPA of the host computer with the link layer protocol (i.e., host computer H4), and further when the communication is an intranetwork communication between 1394 connected host computers. Therefore, the destination HPA accompanying the IP communication corresponds to a host computer other than host computer H4. Thus, if the 1394 NIC of each 1394-connected host computer operates to only accept information including the HPA corresponding to each NIC, then it is possible that the link layer protocol of host computer H4 will not receive the IP communication. In other words, because the destination HPA accompanying the IP communication corresponds to a host computer other than host computer H4, then only the IP protocol of that other host computer receives the IP communication and, thus, there is no need for the link layer protocol to respond. However, if for some reason the NIC of host computer H4 receives the IP communication, then the flow from step 50 to step 38 provides a preferred method flow so that host computer H4 does not respond to the IP communication.

Turning now to step 54, note that it is reached for the preceding example where H7 as a source host computer on the 1394 network sends an IP communication to H1 as a destination host computer on the Ethernet network (i.e., an internetwork communication from the 1394 network to the Ethernet network). In this case, the link layer protocol of host computer H4 operates to communicate the IP communication from the 1394 network to the Ethernet network. In addition, once again the link layer protocol changes the destination HPA which accompanies the IP communication so that the communication is received by the proper destination host computer. More specifically, here again the HPA accompanying the IP communication designates the HPA of the link layer gateway computer. Thus, in the above example of host computer H7 sending an IP communication to host computer H1, at some earlier stage host computer H7 should have issued an address pairing request to IPA1 corresponding to host computer H1, and based on steps 24, 26, 32, 34, and 40, it should have created an entry in its table which correlates IPA1 with HPA4 (i.e., the HPA indicating the link layer gateway computer). Thus, if host computer H4 were to merely forward the IP communication and its original HPA to the Ethernet network, then the destination host computer H1 would not respond because the NIC of that destination host computer would not recognize an HPA value of HPA4. Once again, therefore, in the preferred embodiment the link layer protocol replaces the HPA which accompanied the IP communication with the HPA which corresponds to the destination host computer as indicated by the destination IPA in the IP communication. Accordingly, in the current example, the link layer protocol replaces the value of HPA4 with a value of HPA1 corresponding to host computer H1. After changing the HPA value as described above, the link layer protocol transmits the IP communication to the Ethernet NIC of host computer H4 so that it may then pass the IP communication to the Ethernet network. Thereafter, method 20 returns to step 22 to receive and respond to another data packet.

Completing the steps of FIGS. 4A and 4B, recall that method 20 evaluates in step 24 whether a data packet is an address pairing request, and further evaluates at step 28 whether the data packet is an IP communication. Note further, however, that if the data packet is neither of these two types of communications, method 20 continues to step 44. For example, if the data packet were based on a protocol other than the IP protocol, then it could reach step 44. Lastly, therefore, step 44 is reserved so that additional steps may be ascertained by one skilled in the art to occur in the instance that neither an address pairing request nor an IP communication is encountered.

From the above, it may be appreciated that the above embodiments provide communications between host computers connected to different networks, where those networks are both connected to a link layer gateway computer having a link layer protocol operable to communicate data packets between the two networks. In the preferred embodiment, one of the two interconnected networks is a 1394 network. Indeed, it is currently contemplated that the 1394 standard may become a universal bus for personal computers. If this becomes the case, the present embodiments are readily implemented with such computers and, therefore, are particularly beneficial. The other interconnected network is preferably an Ethernet network, although other networks may be interconnected in a manner consistent with the present teachings and still result in inventive and improved results. Additionally, while the present embodiments have been described in detail, various substitutions, modifications or alterations could be made to the descriptions set forth above without departing from the inventive scope. For example, while the Windows 95 operating system is described above as the preferable operating system providing the IP protocol in the computer which also provides the link layer protocol, still other operating systems may be used as well. Still other examples may be ascertained by one skilled in the art. Therefore, the embodiments described above are by way of example, while the inventive scope of these embodiments is defined by the following claims.

The invention claimed is:

1. A link layer gateway computer operable to communicate a data packet from a source host computer selected from one of a plurality of host computers coupled to a first network medium to a destination host computer selected from one of a plurality of host computers coupled to a second network medium, wherein:
   a first network interface circuit enables connection of said link layer gateway computer to said first network medium; and
   a second network interface circuit enables connection of said link layer gateway computer to said second network medium;
   the link layer gateway computer has an assigned protocol address and a computer protocol handler;
   responsive to either of the first and second network interface circuits receiving a data packet, the computer protocol handler evaluates a destination protocol address in the received data packet;
   the computer protocol handler is responsive to the received data packet if the destination protocol address corresponds to the assigned address of the link layer gateway computer;
   wherein the link layer gateway computer is programmed to execute a link layer protocol handler coupled to communicate with each of the first and second network interface circuits;
   wherein, responsive to either of the first and second network interface circuits receiving a data packet comprising an address pairing communication, the link layer protocol handler evaluates a destination protocol address in the received data packet;
   wherein, responsive to determining that the destination protocol address does not correspond to the assigned address of the link layer gateway computer, the link layer protocol handler determines if a source host computer which transmitted the received data packet and the destination host computer designated by the destination protocol address are not on the same one of either the first network medium or the second network medium;
   wherein:
      responsive to the link layer protocol handler determining that the source host computer which transmitted the received data packet and the destination host computer designated by the destination protocol address are not on the same one of either the first network medium or the second network medium, the link layer protocol handler communicates a reply data packet to the source host computer which transmitted the received data packet;
   the reply data packet comprises an address pairing; and
   the address pairing comprises the destination protocol address and a hardware physical address corresponding to a selected one of the first network interface circuit or the second network interface circuit, wherein the selected network interface circuit is coupled to the same network medium as the source host computer which transmitted the received data packet.

2. The link layer gateway computer of claim 1 further including the link layer gateway computer operable to communicate a data packet from a source host computer selected from one of said plurality of host computers coupled to said second network medium to a destination host computer selected from one of said plurality of host computers coupled to said first network medium.

3. The link layer gateway computer of claim 1, wherein one of said first network medium and said second network medium is an Ethernet network.

4. The link layer gateway computer of claim 1, wherein one of said first network medium and said second network medium is a 1394 network.

5. The link layer gateway computer of claim 1, wherein one of said first network medium and said second network medium is an Ethernet network and the other of said first network medium and said second network medium is a 1394 network.

6. The link layer gateway computer of claim 1, wherein one of said first network medium and said second network medium is a local area network.

7. The link layer gateway computer of claim 1, wherein one of said first network medium and said second network medium is a wide area network.

8. The link layer gateway computer of claim 1, wherein at least one of said first network medium and said second network medium is a wireless network.

9. The link layer gateway computer of claim 1, wherein the link layer gateway computer is programmed to execute an application program coupled to communicate with the computer protocol handler.

10. The link layer gateway computer of claim 9, wherein:
responsive to either of the first and second network interface circuits receiving a data packet comprising a protocol communication, the link layer protocol handler evaluates a destination protocol address in the received data packet; and
responsive to determining that the destination protocol address does not correspond to the assigned address of the link layer gateway computer, the link layer protocol handler determines if a source host computer which transmitted the received data packet and the destination host computer designed by the destination protocol address are not on a same one of either the first network medium or the second network medium.

11. The link layer gateway computer of claim 10, wherein the computer protocol handler is independent of the link layer protocol handler.

12. The link layer gateway computer of claim 10, wherein, responsive to the link layer protocol handler determining that the source host computer which transmitted the received data packet and the destination host computer designated by the destination protocol address are not on the same one of either the first network medium or the second network medium, the link layer protocol communicates the received data packet from the network medium connected to the source host computer to the network medium connected to the destination host computer.

13. The link layer gateway computer of claim 12, wherein:
the received data packet further comprises a hardware physical address;
the destination host computer comprises a network interface circuit coupled to one of either the first network medium or the second network medium;
the network interface circuit of the destination host computer is responsive to a destination hardware physical address; and
prior to communicating the received data packet from the network medium connected to the source host computer to the network medium connected to the destination host computer, the link layer protocol handler changes the hardware physical address to match the destination hardware physical address.

14. The link layer gateway computer of claim 1, wherein:
responsive to the link layer protocol handler determining that the source host computer which transmitted the received data packet and the destination host computer designated by the destination protocol address are not on the same one of either the first network medium or the second network medium, the link layer protocol communicates an address pairing data packet to the destination host computer designated by the destination protocol address; and
the address pairing data packet comprises a source protocol address corresponding to the source host computer which transmitted the received data packet and a hardware physical address corresponding to a selected one of the first network interface circuit or the second network interface circuit, wherein the selected network interface circuit is coupled to the same network medium as the destination host computer.

15. The link layer gateway computer of claim 1, wherein:
responsive to the link layer protocol handler determining that the source host computer which transmitted the received data packet and the destination host computer designated by the destination protocol address are not on the same one of either the first network medium or the second network medium, the link layer protocol communicates a reply data packet to the source host computer which transmitted the received data packet;
the reply data packet comprises an address pairing;
the address pairing comprises the destination protocol address and a hardware physical address corresponding to a selected one of the first network interface circuit or the second network interface circuit, wherein the selected network interface circuit is coupled to the same network medium as the source host computer which transmitted the received data packet;
responsive to the link layer protocol handler determining that the source host computer which transmitted the received data packet and the destination host computer designated by the destination protocol address are not on the same one of either the first network medium or the second network medium, the link layer protocol communicates an address pairing data packet to the destination host computer designated by the destination IP address; and
the address pairing data packet comprises a source protocol address corresponding to the source host computer which transmitted the received data packet and a hardware physical address corresponding to a selected one of the first network interface circuit or the second network interface circuit, wherein the selected network interface circuit is coupled to the same network medium as the destination host computer.

16. A computer, comprising:
a first protocol handler coupling a first network interface circuit to an application program, wherein said first network interface circuit enables connection of said computer to a first network medium;
a second protocol handler coupling a second network interface circuit to an application program, wherein said second network interface circuit enables connection of said computer to a second network medium; and
a link layer protocol coupling said first protocol handler and said first network interface circuit to said second protocol handler and said second network interface circuit;

wherein:

said computer has an assigned protocol address;

responsive to either of the first and second network interface circuits receiving a data packet, one of the first and second protocol handlers evaluates a destination protocol address in the received data packet;

one of the first and second protocol handlers is responsive to the received data packet if the destination protocol address corresponds to the assigned address of the computer;

the computer is programmed to execute the link layer protocol coupled to communicate with each of the first and second network interface circuits;

responsive to either of the first and second network interface circuits receiving a data packet comprising an address pairing communication, the link layer protocol evaluates a destination protocol address in the received data packet; and responsive to determining that the destination protocol address does not correspond to the assigned address of the computer, the link layer protocol handler determines if a source host computer which transmitted the received data packet and the destination host computer designated by the destination protocol address are not on the same one of either the first network medium or the second network medium;

responsive to the link layer protocol determining that the source host computer which transmitted the received data packet and the destination host computer designated by the destination protocol address are not on the same one of either the first network medium or the second network medium, the link layer protocol communicates a reply data packet to the source host computer which transmitted the received data packet;

the reply data packet comprises an address pairing; and the address pairing comprises the destination protocol address and a hardware physical address corresponding to a selected one of the first network interface circuit or the second network interface circuit, wherein the selected network interface circuit is coupled to the same network medium as the source host computer which transmitted the received data packet.

17. The computer of claim 16, wherein said link layer protocol is at the same hierarchical level as said first protocol handler and said second protocol handler.

18. The computer of claim 16, wherein said link layer protocol is not part of an operating system of said computer.

19. The computer of claim 18, wherein said link layer protocol detects whether a data packet received on one of said first network interface circuit and said second interface circuit is intended for a computer coupled to the other of said first network interface circuit and said second interface circuit.

20. The computer of claim 19, wherein said link layer protocol, in response to determining that a data packet received on one of said first network interface and said second interface circuit is intended for a computer coupled to the other of said first network interface circuit and said second interface circuit, directs said data packet to said computer coupled to the other of said first network interface circuit and said second interface circuit.

21. The computer of claim 20, wherein said data packet does not reach any application program(s) of said computer.

22. The computer of claim 16, wherein said link layer protocol is not part of the operating system of said computer and, therefore, executes independently of operating system protocol(s).

23. The computer of claim 16, wherein said first network interface is bi-directionally coupled to said first protocol handler.

24. The computer of claim 16, wherein said first network interface is designed to receive a network medium different from the network medium to be received by said second network interface.

25. The computer of claim 16, wherein said second network interface is bi-directionally coupled to said second protocol handler.

26. The computer of claim 16, wherein one of said first network interface and said second network interface enables connection to an Ethernet network.

27. The computer of claim 16, wherein the other of said first network interface and said second network interface enables connection to a 1394 network.

28. The computer of claim 16, wherein one of said first network interface and said second network interface enables connection to an Ethernet network and the other of said first network interface and said second network interface enables connection to a 1394 network.

29. The computer of claim 16, wherein said computer is programmed to execute an application program coupled to communicate with one of the first and second protocol handlers.

30. The computer of claim 29, wherein:

said computer is programmed to execute the link layer protocol coupled to communicate with each of the first and second network interface circuits;

responsive to either of the first and second network interface circuits receiving a data packet comprising a protocol communication, the link layer protocol evaluates a destination protocol address in the received data packet; and responsive to determining that the destination protocol address does not correspond to the assigned address of the computer, the link layer protocol determines if a source host computer which transmitted the received data packet and the destination host computer designed by the destination protocol address are not on either the first network medium or the second network medium.

31. The computer of claim 30, wherein each of the first and second protocol handlers is independent of the link layer protocol.

32. The computer of claim 30, wherein, responsive to the link layer protocol determining that the source host computer which transmitted the received data packet and the destination host computer designated by the destination protocol address are not the same one of either the first network medium or the second network medium, the link layer protocol communicates the received data packet from the network medium connected to the source host computer to the network medium connected to the destination host computer.

33. The computer of claim 32, wherein:

the received data packet further comprises a hardware physical address;

the destination host computer comprises a network interface circuit coupled to one of either the first network medium or the second network medium;

the network interface circuit of the destination host computer is responsive to a destination hardware physical address; and prior to communicating the received data packet from the network medium connected to the source host computer to the network medium connected to the destination host computer, the link layer protocol changes the hardware physical address to match the destination hardware physical address.

34. The computer of claim 16, wherein:

responsive to the link layer protocol determining that the source host computer which transmitted the received data packet and the destination host computer designated by the destination protocol address are not on the same one of either the first network medium or the second network medium, the link layer protocol communicates an address pairing data packet to the destination host computer designated by the destination protocol address; and the address pairing data packet comprises a source protocol address corresponding to the source host computer which transmitted the received data packet and a hardware physical address corresponding to a selected one of the first network interface circuit or the second network interface circuit, wherein the selected network interface circuit is coupled to the same network medium as the destination host computer.

35. The computer of claim 16, wherein:

responsive to the link layer protocol determining that the source host computer which transmitted the received data packet and the destination host computer designated by the destination protocol address are not on the same one of either the first network medium or the second network medium, the link layer protocol communicates a reply data packet to the source host computer which transmitted the received data packet;

the reply data packet comprises an address pairing;

the address pairing comprises the destination protocol address and a hardware physical address corresponding to a selected one of the first network interface circuit or the second network interface circuit, wherein the selected network interface circuit is coupled to the same network medium as the source host computer which transmitted the received data packet;

responsive to the link layer protocol determining that the source host computer which transmitted the received data packet and the destination host computer designated by the destination protocol address are not on the same one of either the first network medium or the second network medium, the link layer protocol communicates an address pairing data packet to the destination host computer designated by the destination protocol address; and the address pairing data packet comprises a source protocol address corresponding to the source host computer which transmitted the received data packet and a hardware physical address corresponding to a selected one of the first network interface circuit or the second network interface circuit, wherein the selected network interface circuit is coupled to the same network medium as the destination host computer.

* * * * *